(12) United States Patent
Sokolov et al.

(10) Patent No.: US 6,957,428 B2
(45) Date of Patent: Oct. 18, 2005

(54) ENHANCED VIRTUAL MACHINE INSTRUCTIONS

(75) Inventors: Stepan Sokolov, Fremont, CA (US); David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 775 days.

(21) Appl. No.: 09/820,097

(22) Filed: Mar. 27, 2001

(65) Prior Publication Data

US 2003/0018679 A1 Jan. 23, 2003

(51) Int. Cl.$^7$ .............................. G06F 9/44; G06F 9/445
(52) U.S. Cl. ........................................... 718/1; 717/118
(58) Field of Search ..................... 717/136, 139–143, 717/148, 118; 718/1

(56) References Cited

U.S. PATENT DOCUMENTS

| | | | |
|---|---|---|---|
| 4,086,626 A | | 4/1978 | Chung |
| 4,199,811 A | | 4/1980 | Borgerson et al. |
| 4,667,290 A | | 5/1987 | Goss et al. |
| 5,838,980 A | * | 11/1998 | Guillen et al. ............. 717/143 |
| 5,872,978 A | | 2/1999 | Hoskins |
| 5,893,084 A | * | 4/1999 | Morgan et al. ............. 706/50 |
| 5,903,761 A | * | 5/1999 | Tyma ........................ 717/148 |
| 5,920,720 A | | 7/1999 | Toutonghi et al. |
| 6,026,485 A | | 2/2000 | O'Connor et al. |
| 6,072,951 A | | 6/2000 | Donovan et al. |
| 6,072,953 A | | 6/2000 | Cohen et al. |
| 6,081,665 A | | 6/2000 | Nilsen et al. |
| 6,096,095 A | | 8/2000 | Halstead |
| 6,118,940 A | | 9/2000 | Alexander, III et al. |
| 6,151,618 A | * | 11/2000 | Wahbe et al. ................. 718/1 |
| 6,182,202 B1 | * | 1/2001 | Muthukkaruppan ......... 711/212 |
| 6,205,578 B1 | | 3/2001 | Grove |
| 6,260,187 B1 | | 7/2001 | Cirne |
| 6,292,883 B1 | | 9/2001 | Augusteijn et al. |
| 6,332,215 B1 | | 12/2001 | Patel et al. |
| 6,349,377 B1 | | 2/2002 | Lindwer |
| 6,412,108 B1 | | 6/2002 | Blandy et al. |
| 6,434,625 B1 | * | 8/2002 | Loen .......................... 709/236 |
| 6,467,037 B1 | * | 10/2002 | Griesemer ................... 712/205 |
| 6,658,421 B1 | * | 12/2003 | Seshadri ..................... 707/100 |
| 2002/0046298 A1 | | 4/2002 | Bak et al. |
| 2002/0170043 A1 | | 11/2002 | Bagley et al. |

FOREIGN PATENT DOCUMENTS

| | | |
|---|---|---|
| EP | 0 996 059 A2 | 4/2000 |
| WO | WO99/18484 | 4/1999 |
| WO | WO01/22213 A2 | 3/2001 |
| WO | WO0241145 A2 | 5/2002 |
| WO | WO02/077807 A1 | 10/2002 |

OTHER PUBLICATIONS

Lambright H D, "Java Bytecode Optimizations" Proceedings of IEEE Compcon '97 San Jose, Feb. 23–26, 1997, pp. 206–210, XP–000751784.

Accomazzo E et al., "Integrating intermediate Code Optimization with Retargetable Code Generation" Microprocessing and Microprogramming, Elsevier Science Publishers, BV. Amsterdam, NL, vol. 30, No. 1/5, Aug. 1, 1990, pp. 475–481, XP000141684.

(Continued)

Primary Examiner—Meng-Al T. An
Assistant Examiner—Syed J Ali
(74) Attorney, Agent, or Firm—Beyer Weaver & Thomas, LLP

(57) ABSTRACT

Techniques for implementing virtual machine instructions suitable for execution in virtual machines are disclosed. The operations performed by conventional instructions can be performed by relatively fewer inventive virtual machine instructions. Furthermore, the virtual machine instructions can be used to perform operations that cannot readily be performed by conventional Java Bytecode instructions. Thus, a more elegant, yet robust, virtual machine instruction set can be implemented.

16 Claims, 14 Drawing Sheets

OTHER PUBLICATIONS

Tim Ritchey, "Java!" 1995, New Riders Publishing, pp., 326–343.

Jon Meyer & Troy Downing, "Java Virtual Machine," 1997, O'Reilly & Associates, Inc. pp. 46, 56–57, 74–75, 389 and 391.

Microsoft Press Computer Dictionary Third Edition, pp. 294–295.

Chang et al., "EJVM: an economic Java run–time environment for embedded devices," Software Practice & Experience, 2001, John Wiley & Sons, Ltd., vol. 31, pp. 129–146. XP–000987539.

Gosling et al., "The Java™ Language Specification", Aug. 1, 1996, pp. 215–236. XP 002042923.

Zhenyu Qian, "A formal Specification of Java™ Virtual Machine Instructions," Technical Report, University Bremen; Nov. 1997, pp. 1–32. XP–002255760.

Piumarta et al., "Optimizing Direct Threaded Code by Selective Inlining," Assoiciation for Computing Machinery, vol. 33, No. 5, pp. 291–300, May 1, 1998.XP–000766278.

Tommesani, "Programming models".

Lindholm et al, "The Java™ Virtual Machine Specification", (Sep., 1996), Sun Microsystems, Inc., Chapters 1–10 (173 pp.).

Case B: "Implementing The Java Virtual Machine Java's Complex Instruction Set Can Be Built in Software or Hardware," Microprocessor Report, vol. 10, No. 4, Mar. 25, 1996, pp. 12–17.

McNeley KJ et al., "Emulating a Complex Instruction Set Computer With a Reduced Instruction Set Computer,"IEEE Micro, IEEE Inc. New York, US, vol. 7, No. 1, Feb. 1987, pp. 60–71.

Jean–Paul Billon, "JEFFWEG4 (J Executable File Format), Release 1.0 Achievements, Sep. 29, 2000," J Consortium Jeff Working Group, 'Online! Feb. 22, 2001, p. 1–24.

Jean–Paul Billon, "J Executable File Format (JEFF) Specification, Draft," J Consortium Jeff Working Group, 'Online! Feb. 22, 2001, p. 1–43.

* cited by examiner

| LOAD |
|---|
| iload |
| fload |
| aload |
| iload_0 |
| iload_1 |
| iload_2 |
| iload_3 |
| fload_1 |
| fload_2 |
| fload_3 |
| aload_0 |
| aload_1 |
| aload_2 |
| aload_3 |

| LOADL |
|---|
| lload |
| dload |
| lload_0 |
| lload_1 |
| lload_2 |
| lload_3 |
| fload_0 |
| dload_0 |
| dload_1 |
| dload_2 |
| dload_3 |

Fig. 5B  Fig. 5C

| | |
|---|---|
| lcmp | OP_LSUB, OP_JMPEQ |
| fcmpl | OP_FSUB, OP_JMPLE |
| fcmpg | OP_FSUB, OP_JMPGE |
| dcmpl | OP_DCMP, OP_JMPLE |
| dcmpg | OP_DCMP, OP_JMPGE |

Fig. 6F

| | |
|---|---|
| if_icmpeq | OP_ISUB, OP_JMPEQ |
| if_icmpne | OP_ISUB, OP_JMPNE |
| if_icmplt | OP_ISUB, OP_JMPLT |
| if_icmpge | OP_ISUB, OP_JMPGE |
| if_icmpgt | OP_ISUB, OP_JMPGT |
| if_icmple | OP_ISUB, OP_JMPLE |
| if_acmpeq | OP_ISUB, OP_JMPEQ |
| if_acmpne | OP_ISUB, OP_JMPNE |

Fig. 6G

| NEW |
|---|
| New |
| Newarray |
| Anewarray |
| Multianewarray |

Fig. 9

| LRETURN |
|---|
| Lreturn |
| Dreturn |

Fig. 8B

| RETURN |
|---|
| Ireturn |
| Freturn |
| Areturn |

Fig. 8A

ENHANCED VIRTUAL MACHINE INSTRUCTIONS

CROSS-REFERENCE TO RELATED APPLICATIONS

This application is related to U.S. patent application Ser. No. 09/819,120, entitled "REDUCED INSTRUCTION SET FOR JAVA VIRTUAL MACHINES", filed on an even date, and hereby incorporated herein by reference for all purposes.

This application is related to U.S. patent application Ser. No. 09/703,361, entitled "IMPROVED FRAMEWORKS FOR INVOKING METHODS IN VIRTUAL MACHINES", which is hereby incorporated herein by reference for all purposes.

This application is related to U.S. patent application Ser. No. 09/703,356, entitled "IMPROVED METHODS AND APPARATUS FOR NUMERIC CONSTANT VALUE INLINING IN VIRTUAL MACHINES", which is hereby incorporated herein by reference for all purposes.

This application is related to U.S. patent application Ser. No. 09/703,449, entitled "IMPROVED FRAMEWORKS FOR LOADING AND EXECUTION OF OBJECT-BASED PROGRAMS", which is hereby incorporated herein by reference for all purposes.

BACKGROUND OF THE INVENTION

The present invention relates generally to object-based high level programming environments, and more particularly, to virtual machine instruction sets suitable for execution in virtual machines operating in portable, platform independent programming environments Recently, the Java™ programming environment has become quite popular. The Java™ programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation.

The Java virtual machine is commonly implemented in software by means of an interpreter for the Java virtual machine instruction set but, in general, may be software, hardware, or both. A particular Java virtual machine implementation and corresponding support libraries, together constitute a Java™ runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification, on any computer that is able to run an implementation of the Java™ runtime environment. A class written in the Java programming language is compiled to a particular binary format called the "class file format" that includes Java virtual machine instructions for the methods of a single class. In addition to the Java virtual machine instructions for the methods of a class, the class file format includes a significant amount of ancillary information that is associated with the class. The class file format (as well as the general operation of the Java virtual machine) is described in some detail in *The Java Virtual Machine Specification* by Tim Lindholm and Frank Yellin (ISBN 0-201-31006-6), which is hereby incorporated herein by reference.

Conventional virtual machines interpreter decodes and executes the Java Bytecode instructions, one instruction at a time during execution, e.g., "at runtime." To execute a Java instruction, typically, several operations have to been performed to obtain the information that is necessary to execute the Java instruction. For example, to invoke a method referenced by a Java bytecode, the virtual machine must perform several operations to access the Constant Pool simply to identify the information necessary to locate and access the invoked method.

As described in *The Java Virtual Machine Specification*, one of the structures of a standard class file is known as the "Constant Pool." The Constant Pool is a data structure that has several uses. One of the uses of the Constant Pool that is relevant to the present invention is that the Constant Pool contains the information that is needed to resolve various Java Instructions. To illustrate, FIG. 1 depicts a conventional computing environment 100 including a stream of Java Bytecodes 102, a constant pool 104 and an execution stack 106. The stream of Java Bytecodes 102 represents a series of bytes in a stream where one or more bytes can represent a Java Bytecode instruction. For example, a byte 108 can represent a Ldc (load constant on the execution stack) Bytecode command 108. Accordingly, the bytes 110 and 112 represent the parameters for the Ldc Bytecode command 108. In this case, these bytes respectively represent a CP-IndexA 100 and CP-IndexB 112 that collectively represent the index to appropriate constant value in the constant pool 104. For example, bytes C1, C2, C3 and C4 of the constant pool 104 can collectively represent the appropriate 4 byte (one word) constant C that is to loaded to the top of the execution stack 106. It should be noted that Ldc Bytecode command 108 and its parameters represented by bytes 110 and 112 are collectively referred to herein as a Java Bytecode instruction.

In order to execute the Java Bytecode Ldc Instruction 108, at run time, an index to the Constant Pool 104 is constructed from the CP-IndexA and CP-IndexA. Once an index to the Constant Pool has been determined, the appropriate structures in the Constant Pool have to be accessed so that the appropriate constant value can be determined. Accordingly, the Java Bytecode Ldc instruction can be executed only after performing several operations at run time. As can be appreciated from the example above, the execution of a relatively simple instruction such as loading a constant value can take a significant amount of run time. Hence, this conventional technique is an inefficient approach that may result in significantly longer execution times.

Another problem is that the conventional Java Bytecode instruction set has more than 220 instructions. Moreover, there is a significant amount of redundancy between some instructions in the conventional Java Bytecode instruction set. For example, there are different Java Bytecode instructions for storing (or pushing) integer local variables on the execution stack (e.g., iLoad), and storing (or pushing) a pointer local variable on the execution stack (e.g., aLoad). However, the operations performed by these instructions are virtually identical, namely, storing (or pushing) 4 byte values (a word) on the execution stack. There is also a significant amount of overlap between some instructions of the conventional Java Bytecode instruction set. For example, there are 5 different Java Bytecode instructions for pushing one byte integer values on the execution stack (i.e., iconst_1, iconst_2, iconst_3, iconst_4 and iconst_5). However, these operations virtually perform the same operations, namely, pushing a constant one byte integer value on the execution stack.

As noted above, the Java Bytecode instruction set has more than 220 instructions. This means that conventionally nearly all of the 256 ($2^8$) allowable Bytecode values have to be assigned to Java instructions (commands or opcodes). As a result, Java interpreters are needlessly complex since they need to recognize a relatively large number of Java instructions and possibly implement various mechanisms for executing many instructions. Thus, the conventional Java Bytecode instruction set is not a very desirable solution for systems with limited resources (e.g., embedded systems)

Accordingly, there is a need for alternative instructions suitable for execution in virtual machines.

SUMMARY OF THE INVENTION

To achieve the foregoing and other objects of the invention, techniques for implementing virtual machine instructions suitable for execution in virtual machines are disclosed. The inventive virtual machine instructions can effectively represent the complete set of operations performed by the conventional Java Bytecode instruction set. Moreover, the operations performed by conventional instructions can be performed by relatively fewer inventive virtual machine instructions. Furthermore, the inventive virtual machine instructions can be used to perform operations that cannot readily be performed by conventional Java Bytecode instructions. Thus, a more elegant yet robust virtual machine instruction set can be implemented. This in turn allows implementation of relatively simpler interpreters as well as allowing alternative uses of the limited 256 ($2^8$) Bytecode representation (e.g., a macro representing a set of commands). As a result, the performance of virtual machines, especially, those operating in systems with limited resources, can be improved.

The invention can be implemented in numerous ways, including a system, an apparatus, a method or a computer readable medium. Several embodiments of the invention are discussed below.

As a set of virtual machine instructions suitable for execution in a virtual machine to load constant values on an execution stack, one embodiment of the invention provides instructions representing a number of corresponding Java Bytecode executable instructions that are also suitable for execution in the virtual machine to load constant values on an execution stack. The set of the virtual machine instructions consists of a number of virtual machine instructions that is less than the number of the corresponding Java Bytecode executable instructions. In addition, every one of the corresponding Java Bytecode executable instructions can be represented by at least one of the virtual machine instructions in the virtual machine instruction set.

As a set of virtual machine instructions suitable for execution in a virtual machine to store local variables onto an execution stack, one embodiment of the invention provides virtual machine instructions representing a number of corresponding Java Bytecode executable instructions that are also suitable for execution in the virtual machine to store local variables onto an execution stack. The set of virtual machine instructions consists of a number of virtual machine instructions that is less than the number of the corresponding Java Bytecode executable instructions. In addition, every one of the corresponding Java Bytecode executable instructions can be represented by at least one of the virtual machine instructions in the virtual machine instruction set.

As a virtual machine instruction suitable for execution in a virtual machine to load values from arrays on an execution stack, one embodiment of the invention provides a virtual machine instruction representing two or more Java Bytecode executable instructions that are also suitable for loading values from arrays on the execution stack.

As a virtual machine instruction suitable for execution in a virtual machine to store values located on an execution stack into arrays, one embodiment of the invention provides a virtual machine instruction representing two or more Java Bytecode executable instructions that are also suitable for storing values located on an execution stack into an array.

One embodiment of the invention provides a virtual machine instruction suitable for execution in a virtual machine to duplicate values stored in an execution stack on top of the execution stack. The virtual machine instruction represents two or more Java Bytecode executable instructions that are also suitable for duplicating values stored in the execution stack on top of the execution stack.

Another embodiment of the invention provides a virtual machine instruction suitable for execution in a virtual machine to duplicate values stored in an execution stack on top of the execution stack, wherein the virtual machine instruction has a parameter associated with it to indicate which value stored in the execution stack should be duplicated on the top of the stack.

As a virtual machine instruction suitable for execution in a virtual machine, one embodiment of the invention operates to return values by placing them on top of an execution stack. The virtual machine instruction represents two or more Java Bytecode executable instructions that are also suitable for returning values by placing them on top of the execution stack.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 5B illustrates a set of Java Bytecode instructions for loading 4 byte local variables that can be represented by an inventive Load command in accordance with one embodiment of the invention.

FIG. 5C illustrates a set of Java Bytecode instructions for loading 8 byte local variables in accordance with one embodiment of the invention.

FIGS. 8A and 8B illustrate mapping of Java Bytecode return instructions to virtual machine instructions provided in accordance with one embodiment of the invention.

FIG. 9 illustrates a mapping of Java Bytecode instantiation instructions to the virtual machine instructions provided in accordance with one embodiment of the invention

DETAILED DESCRIPTION OF THE INVENTION

As described in the background section, the Java programming environment has enjoyed widespread success. Therefore, there are continuing efforts to extend the breadth of Java compatible devices and to improve the performance of such devices. One of the most significant factors influencing the performance of Java based programs on a particular platform is the performance of the underlying virtual machine. Accordingly, there have been extensive efforts by a number of entities to improve performance in Java compliant virtual machines.

To achieve this and other objects of the invention, techniques for implementing virtual machine instructions suitable for execution in virtual machines are disclosed. The inventive virtual machine instructions can effectively represent the complete set of operations performed by the conventional Java Bytecode instruction set. Moreover, the operations performed by conventional instructions can be performed by relatively fewer inventive virtual machine instructions. Furthermore, the inventive virtual machine instructions can be used to perform operations that cannot readily be performed by the conventional Java Bytecode instructions. Thus, a more elegant yet robust virtual machine instruction set can be implemented. This, in turn, allows implementation of relatively simpler interpreters as well as allowing for alternative uses of the limited 256 ($2^8$) Bytecode representation (e.g., a macro representing a set of commands). As a result, the performance of virtual machines, especially, those operating in systems with limited resources, can be improved.

Embodiments of the invention are discussed below with reference to FIGS. 2–9. However, those skilled in the art will readily appreciate that the detailed description given herein with respect to these figures is for explanatory purposes only as the invention extends beyond these limited embodiments.

Figure 1:
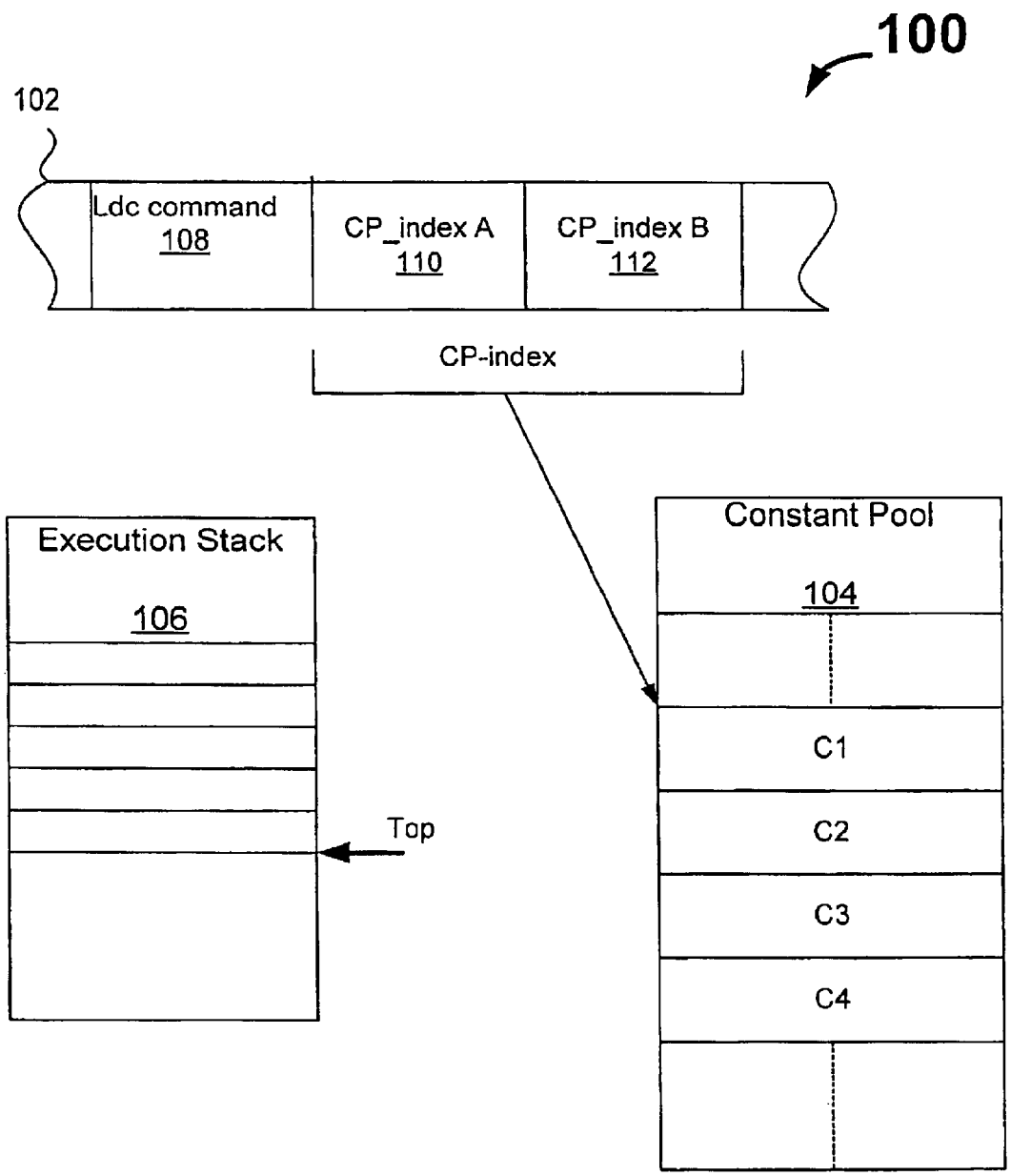
FIG. 1 depicts a conventional computing environment including a stream of Java Bytecodes, a constant pool, and an execution stack.
Figure 2A:
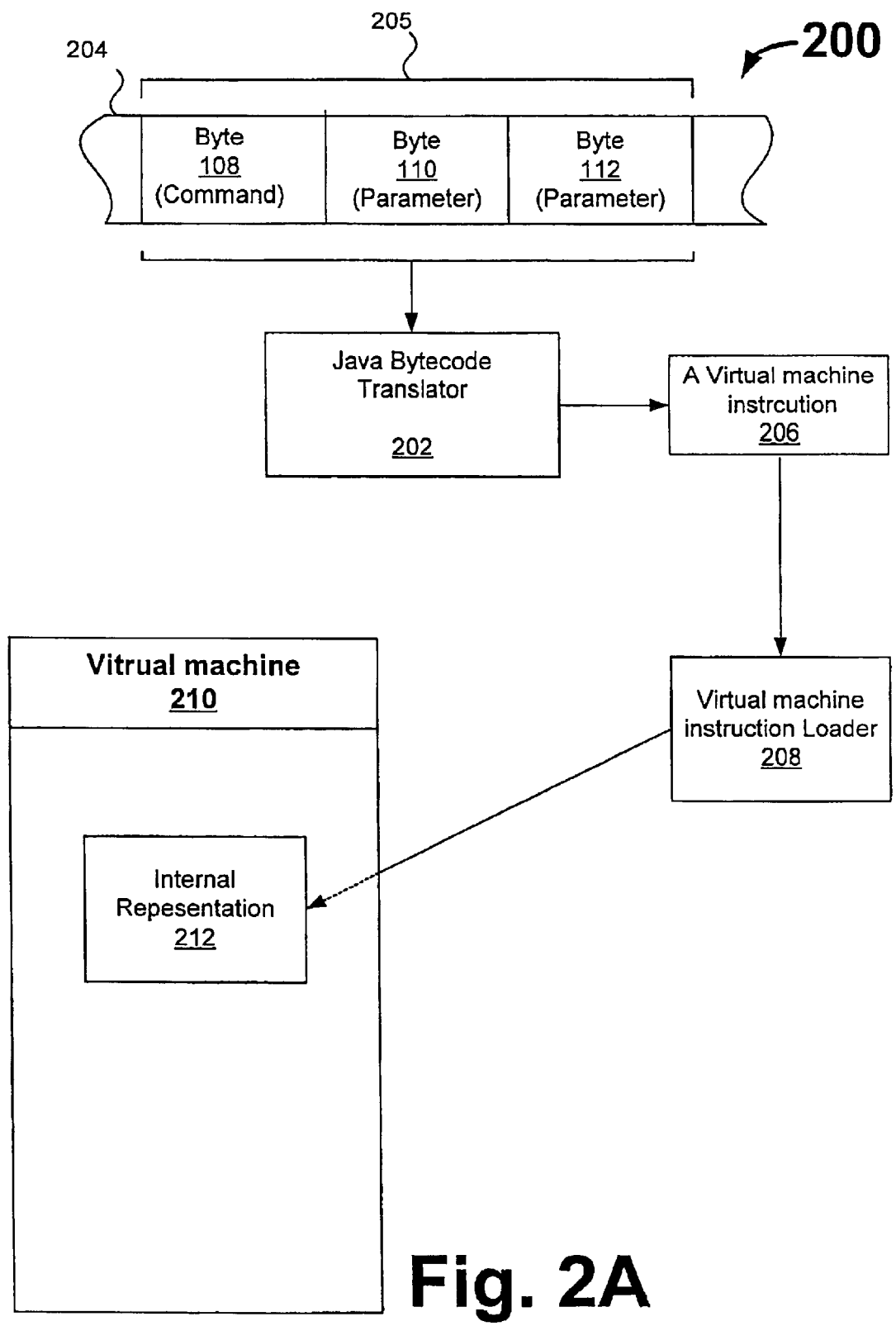
FIG. 2A is a block diagram representation of a computing environment including a Java Bytecode instruction translator in accordance with one embodiment of the invention.

FIG. 2A is a block diagram representation of a computing environment 200 including a Java Bytecode instruction translator 202 in accordance with one embodiment of the invention. The Java Bytecode instruction translator 202 operates to convert one or more bytes of a Java Bytecode stream 204, representing a Java Bytecode instruction 205 into a virtual machine instruction 206 containing one or more bytes. The Java Bytecode instruction 205 in the Java Bytecode stream 204 can be, for example, a "Lcd" command 108 with its associated parameters 110 and 112, as described in FIG. 1.

Typically, one byte of the virtual machine instruction 206 is designated to represent a virtual machine command (or opcode). In addition, one or more additional bytes may be associated with the virtual machine command (or opcode) to represent its parameters. As a result, one or more bytes of the virtual machine instruction 206 can represent a Java Bytecode instruction having one or more bytes that collectively represent a Java Bytecode instruction, namely a command and possibly the parameters associated with the command (e.g., a one byte Java iconst_1 Bytecode instruction, three bytes representing Java Bytecode Lcd instruction, etc).

As will be appreciated, the virtual machine instruction 206 can represent similar virtual machine operations that the Java Bytecode instruction 205 represents. In addition, the virtual machine instruction 206 can be loaded by a virtual machine instruction loader 208 into a virtual machine 210 as an internal representation 212. As will become apparent, the internal representation 212 can be used to significantly improve the performance of the virtual machine.

Furthermore, the Java Bytecode instruction translator 202 is capable of converting a set of Java Bytecode executable instructions into a more elegant set of instructions that is especially suitable for systems with limited resources. The operations performed by a conventional Bytecode instruction set can effectively be represented by fewer inventive virtual machine instructions. Accordingly, the number of the executable virtual machine instructions can be significantly less than the number of conventional Java Bytecode executable instructions needed to perform the same set of operations. In other words, two or more distinct conventional Java Bytecode executable instructions can effectively be mapped into an inventive virtual machine instruction.

Figure 2B:
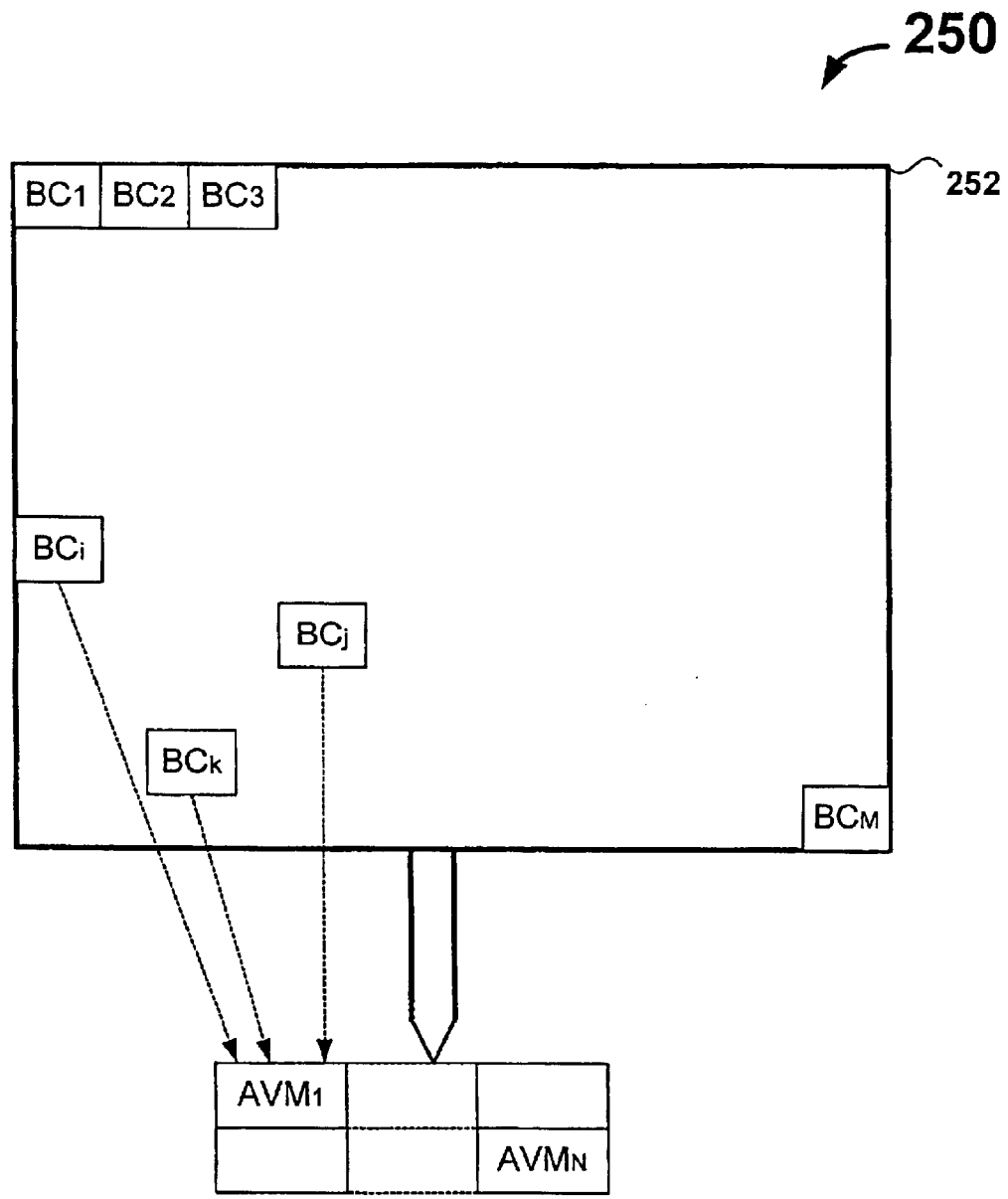
FIG. 2B illustrates a mapping that can be performed by the Java Bytecode instruction translator of FIG. 2A in accordance with one embodiment of the invention.

To elaborate, FIG. 2B illustrates a mapping 250 that can be performed, for example, by the Java Bytecode instruction translator 202 in accordance with one embodiment of the invention. As illustrated in FIG. 2B, a set of conventional Java Bytecode executable instructions 252 can be mapped into a corresponding set of inventive virtual machine instructions 254. It should be noted that the set of Java Bytecode executable instructions 252 consists of M instructions, Bytecode Instructions ($BC_1$–$BC_M$). It should also be noted that each of the Byte code Instructions $BC_1$–$BC_M$ represent a unique instruction in the set of Java Bytecode executable instructions 252. As will be appreciated, the corresponding set of executable virtual machine instructions 254 consists of N instructions ($AVM_1$–$AVM_N$), a number that can be significantly less than M (the number of Java Bytecode executable instructions 252). Accordingly, two or more Byte code Instructions of the Java Bytecode executable instructions 252 can be mapped into the same executable virtual machine instruction. For example, Bytecode Instructions $BC_i$, $BC_j$ and $BC_k$ can all be mapped into the same virtual machine executable instruction, namely, the instruction $AVM_1$. In addition, as will be described below, two or more inventive virtual machine instructions from the set 254 can be combined to effectively represent a Java Bytecode instruction in the set 252.

Figure 3:
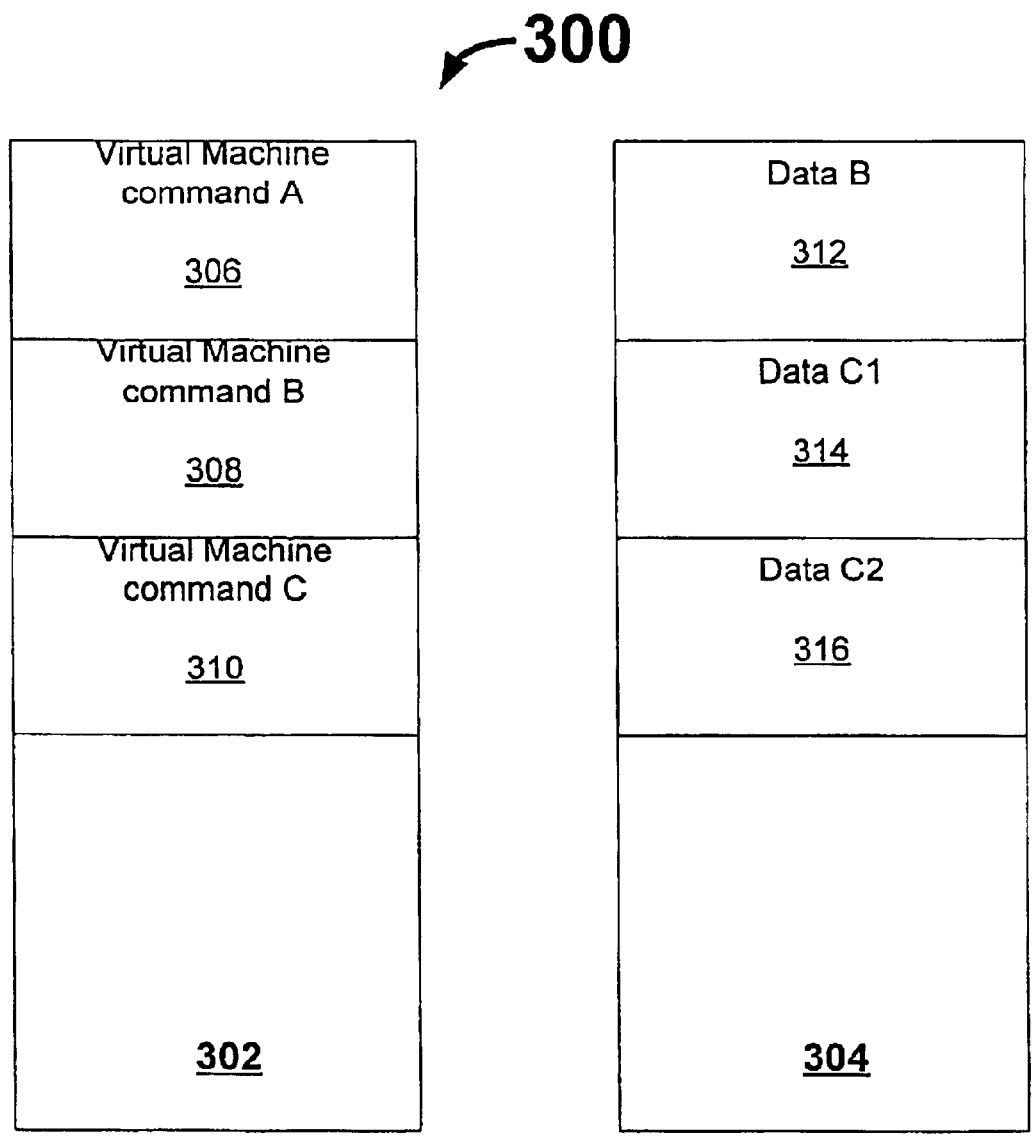
FIG. 3 illustrates an internal representation of Java instructions in accordance with one embodiment of the invention.

As noted above, a virtual machine instruction, for example, the instruction $AVM_1$, can be loaded by a virtual machine instruction loader into a virtual machine as an internal representation that can be used to significantly improve the performance of the virtual machine. FIG. 3 illustrates an internal representation 300 in accordance with one embodiment of the invention. The internal representation 300 can, for example, be implemented as a data structure embodied in a computer readable medium that is suitable for use by a virtual machine. As shown in FIG. 3, the internal representation 300 includes a pair of streams, namely, a code stream 302 and a data stream 304.

It should be noted that conventionally Java Bytecode instructions are internally represented as a single stream in the virtual machine. However, as shown in FIG. 3, the internal representation 300 includes a pair of streams, namely, a code stream 302 and a data stream 304. More details about representing instructions as a pair of streams can be found in the U.S. patent application Ser. No. 09/703,449, entitled "IMPROVED FRAMEWORKS FOR LOADING AND EXECUTION OF OBJECT-BASED PROGRAMS".

Each one of the entries in the code stream 302 and/or data stream 304 represent one or more bytes. The code stream 302 includes various virtual machine commands (or instructions) 306, 308 and 310. The virtual machine commands (or instruction) 306 represents a virtual machine instruction that does not have any parameters associated with it. On the other hand, each of the virtual machine commands B and C have associated data parameters that are represented in the data stream 304. More particularly, data B is the corresponding data parameter of the virtual machine command B, and data C1 and C2 are the data parameters associated with the command C.

It should be noted that the inventive virtual machine command B and data B represents one or more conventional Java Bytecodes which have been converted, for example, by the Java Bytecode instruction translator 202 of FIG. 2A. Similarly, the virtual machine command C, data C1 and C2 collectively represent the one or more Java Bytecodes that have been converted into an inventive virtual machine instruction with its appropriate data parameters.

Figures 4A, 4B:
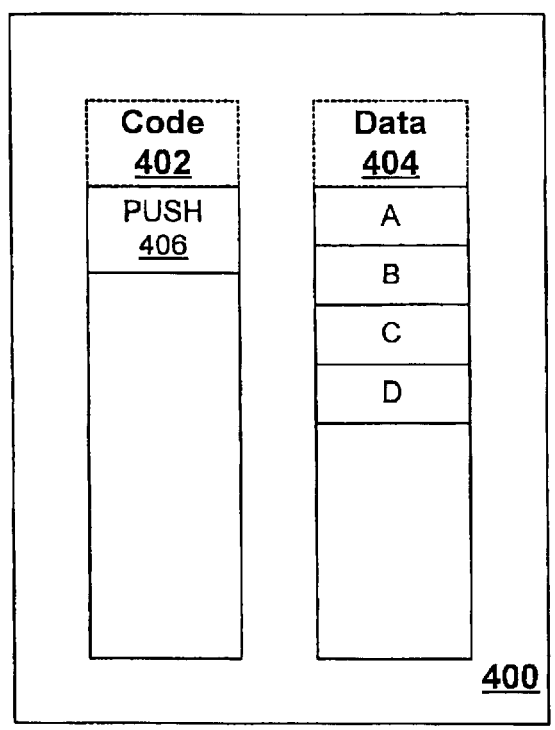
FIG. 4A illustrates an internal representation of a set of Java Load Constant Bytecode instructions in accordance with one embodiment of the invention.
FIG. 4B illustrates a set of conventional Java Bytecode instructions that can be represented by an inventive Push command.

FIG. 4A illustrates an internal representation 400 of a set of Java Load Constant Bytecode instructions in accordance with one embodiment of the invention. The internal representation 400 can, for example, be implemented as a data structure embodied in a computer readable medium that is suitable for use by a virtual machine.

In the described embodiment, each entry in the code stream 402 and data stream 404 represents one byte. As such, the code stream 402 includes a one byte Push command 406, representing an inventive virtual machine command suitable for representation of one or more conventional Java Load Constant Bytecode instructions. The data stream 404 includes the data parameters associated with the Push command 406, namely, bytes A, B, C and D. As will be appreciated, at execution time, the virtual machine can execute the Push command 406. Accordingly, the value represented by the bytes A, B, C and D in the data stream 404 can be pushed on the execution stack. In this way, the Push command 406 can effectively represent various Java Bytecode instructions that push values represented by 4 bytes (one word) on the execution stack at run time. FIG. 4B illustrates a set of conventional Java Bytecode instructions that can be represented by an inventive Push command (e.g., Push command 406).

Figures 4C, 4D:
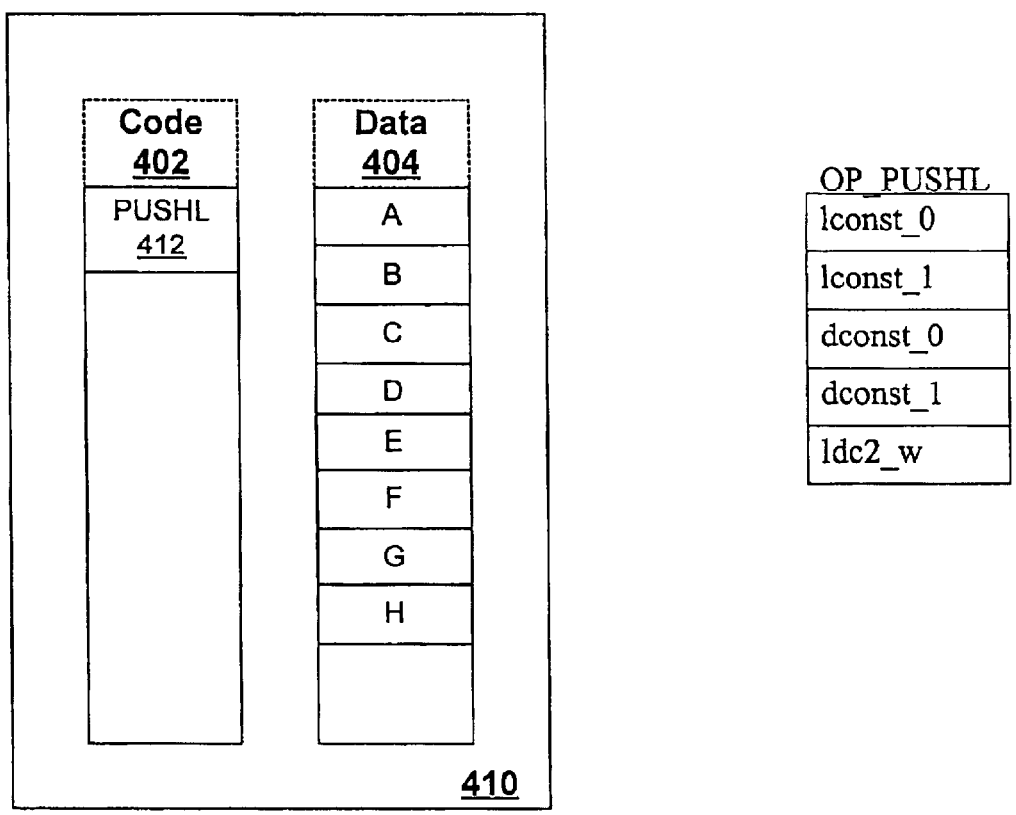
FIG. 4C illustrates an internal representation of a set of conventional Java Load Constant Bytecode instructions in accordance with another embodiment of the invention.
FIG. 4D illustrates a set of conventional Java Bytecode instructions that can be represented by a single PushL command in accordance with one embodiment of the invention.

FIG. 4C illustrates an internal representation 410 of a set of conventional Java Load Constant Bytecode instructions in accordance with another embodiment of the invention. Similar to the internal representation 400 of FIG. 4A, the internal representation 410 includes a pair of streams, namely, the code stream 402 and data stream 404, wherein each entry in the streams represents one byte. However, in FIG. 4B, the code stream 402 includes a one byte PushL command 412, representing another inventive virtual machine instruction suitable for representation of one or more Java Load Constant Bytecode instructions. It should be noted that the PushL command 412 has 8 bytes of data associated with it, namely, the bytes represented by A, B, C, D, E, F, G and H in the data stream 404. At execution time, the virtual machine can execute the PushL command 412 to push the value represented by the bytes A, B, C, D, E, F, G and H in the data stream 404, on the top of the execution stack. Accordingly, the PushL command 412 can effectively represent various Java Bytecode instructions that push 8 byte (two word) values on the execution stack at run time. FIG. 4D illustrates a set of conventional Java Bytecode instructions that can be represented by a single PushL command (e.g., PushL command 412) in accordance with one embodiment of the invention.

Figures 4E, 4F:
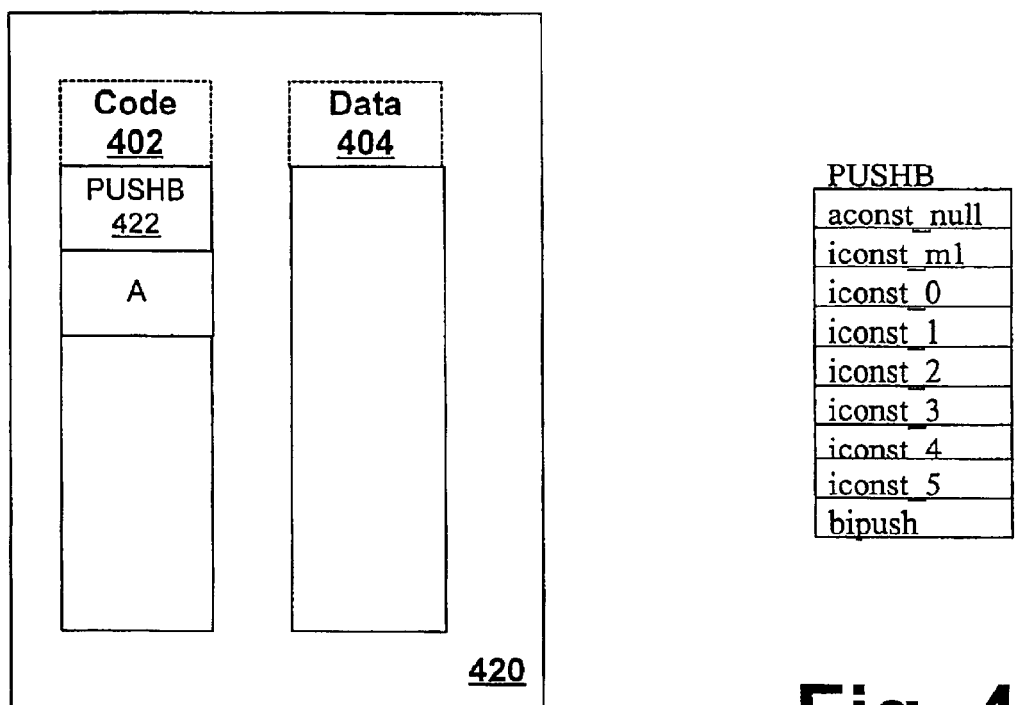
FIG. 4E illustrates an internal representation of a set of Java Load Constant Bytecode instructions in accordance with yet another embodiment of the invention.
FIG. 4F illustrates a set of Java Bytecode instructions that can be represented by a single PushB command in accordance with one embodiment of the invention.

FIG. 4E illustrates an internal representation 420 of a set of Java Load Constant Bytecode instructions in accordance with yet another embodiment of the invention. Again, the internal representation 420 includes the code stream 402 and data stream 404, wherein each entry in the streams represents one byte. However, in FIG. 4E, the code stream 402 includes a one byte PushB command 422, representing yet another inventive virtual machine instruction suitable for representation of one or more Java Load Constant Bytecode instructions. It should be noted that the PushB command 422 has a one byte data parameter A associated with it. As shown in FIG. 4E, the data parameter can be stored in the code stream 402. However, it should be noted that in accordance with other embodiments of the invention, the data parameter A can be stored in the data stream 404. In any case, the PushB command 422 can effectively represent various Java Bytecode instructions that push one byte values on the execution stack at run time. FIG. 4F illustrates a set of Java Bytecode instructions that can be represented by a single PushB command (e.g., PushB command 422) in accordance with one embodiment of the invention.

Figure 5A:
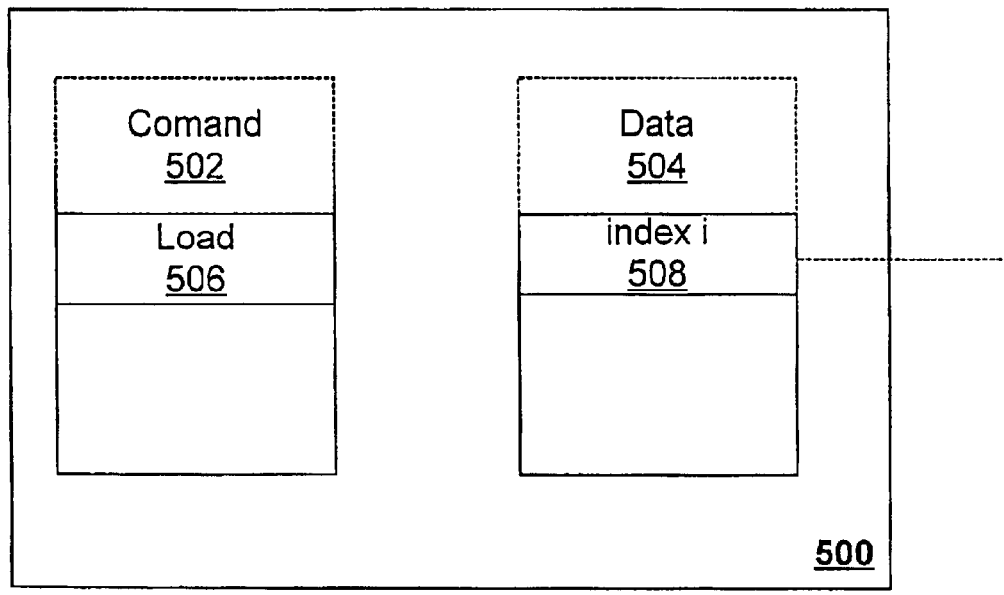
FIG. 5A illustrates an internal representation of a set of Java Load from a local variable instructions in accordance with another embodiment of the invention.
Figure 5A:
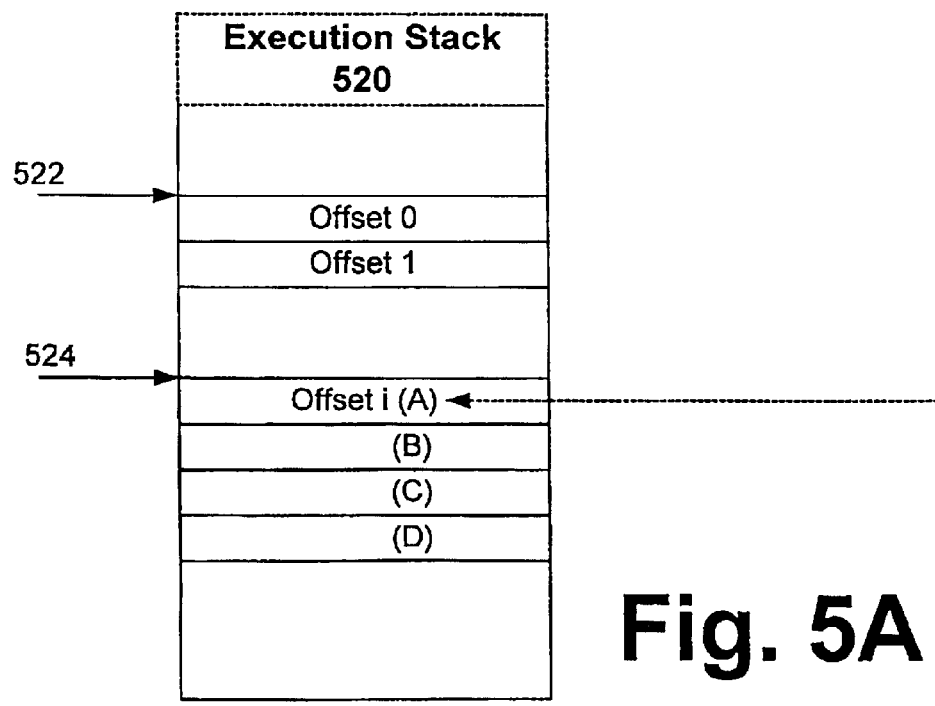

FIG. 5A illustrates an internal representation 500 of a set of Java "Load from a local variable" instructions in accordance with another embodiment of the invention. In the described embodiment, a code stream 502 of the internal representation 500 includes a Load command 506, representing an inventive virtual machine instruction suitable for representation of one or more Java "Load from a local variable" Bytecode instructions. It should be noted that the Load command 506 has a one byte parameter associated with it, namely, an index$_i$ 508 in the data stream 504. As will be appreciated, at run time, the Load command 506 can be executed by a virtual machine to load (or push) a local variable on top of the execution stack 520. By way of example, an offset$_0$ 522 can indicate the starting offset for the local variables stored on the execution stack 520. Accordingly, an offset$_i$ 524 identifies the position in the execution stack 520 which corresponds to the index 508 shown in FIG. 5A.

It should be noted that in the described embodiment, the Load command 506 is used to load local variables as 4 bytes (one word). As a result, the value indicated by the 4 bytes A, B, C and D (starting at offset$_i$ 524) is loaded on the top of the execution stack 520 when the Load command 506 is executed. In this manner, the Load command 506 and index$_i$ 508 can be used to load (or Push) 4 byte local variables on top of the execution stack at run time. As will be appreciated, the Load command 506 can effectively represent various conventional Java Bytecode instructions. FIG. 5B illustrates a set of Java Bytecode instructions for loading 4 byte local variables that can be represented by an inventive Load command (e.g., Load command 412) in accordance with one embodiment of the invention.

It should be noted that the invention also provides for loading local variables that do not have values represented by 4 bytes. For example, FIG. 5C illustrates a set of Java Bytecode instructions for loading 8 byte local variables in accordance with one embodiment of the invention. As will be appreciated, all of the Java Bytecode instructions listed in FIG. 5C can be represented by a single inventive virtual machine instruction (e.g., a LoadL command). The LoadL command can operate, for example, in a similar manner as discussed above.

Figures 6A, 6B:
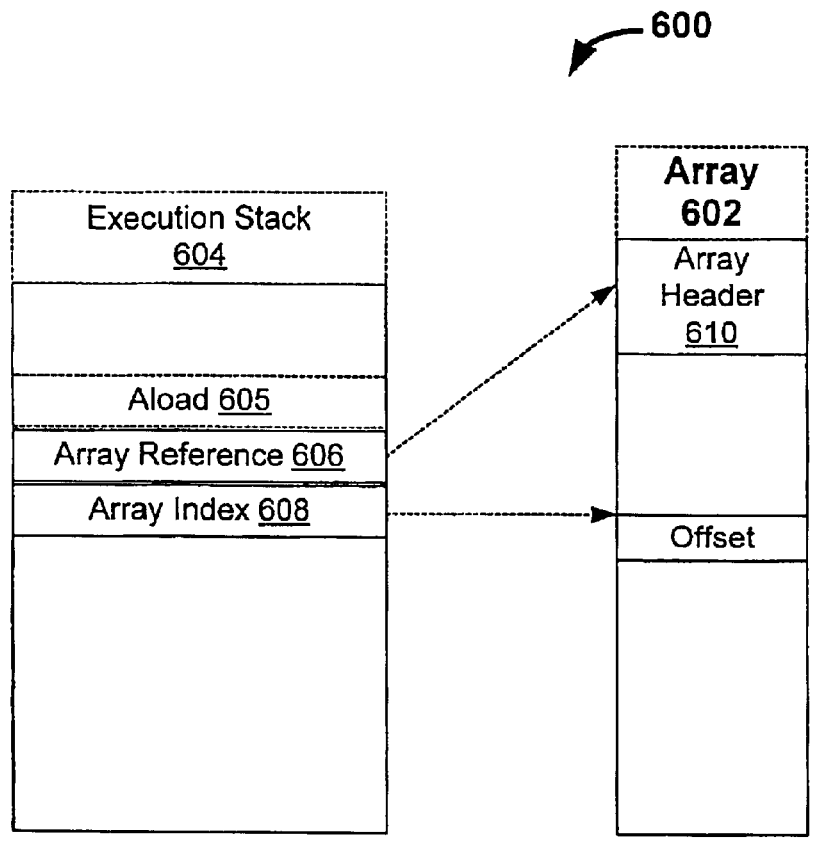
FIG. 6A illustrates a computing environment including an Aload (load from array) virtual machine instruction in accordance with one embodiment of the invention.
FIG. 6B illustrates a set of conventional Java Bytecode instructions for loading arrays that can be represented by a single inventive virtual machine instruction in accordance with one embodiment of the invention.
Figure 6C:
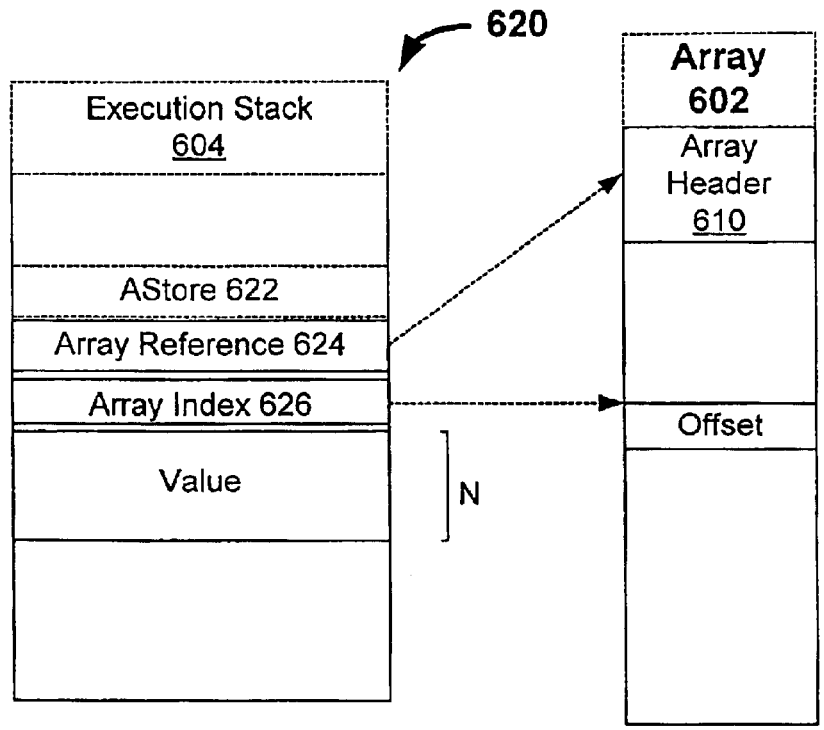
FIG. 6C illustrates a computing environment including an AStore (store into array) virtual machine instruction in accordance with one embodiment of the invention.
Figure 6:
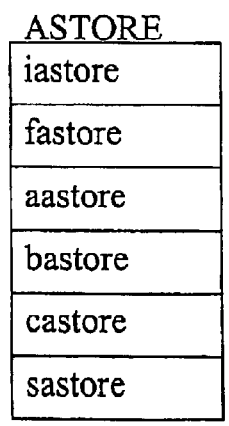
FIGS. 6D and 6E illustrate a set of conventional Java Bytecode instructions for storing arrays that can be represented by a single inventive virtual machine instruction.
FIGS. 6F and 6G illustrate some Java conventional Bytecode instructions for performing conditional flow operations which can be represented by two inventive virtual machine instructions in accordance with one embodiment of the invention.
Figure 6:
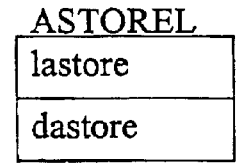

In addition, the invention provides for loading values from arrays into an execution stack. By way of example, FIG. 6A illustrates a computing environment 600 in accordance with one embodiment of the invention. The computing environment 600 includes an array 602 representative of a Java array stored in a portion of a memory of the computing environment 600. An execution stack 604 is also depicted in FIG. 6. As will be appreciated, an inventive virtual machine instruction ALoad (array load) 605 can be utilized to facilitate loading of various values from the array 602 to the top of the execution stack 604.

During the execution of the virtual machine instruction ALoad 605, an array-reference 606 can be utilized (e.g., resolved) to determine the location of the array 602. In addition, an array-index 608 can be used to identify the appropriate offset of the array 602 and thereby indicate the appropriate value that is to loaded from the array 602 on the execution stack 604. As will be appreciated, the inventive virtual machine instruction ALoad can be used to load the appropriate values from various types of arrays (e.g., 1 byte, 2 bytes, 4 bytes, 8 bytes arrays). To achieve this, a header 610 of the array 602 can be read to determine the arrays' type. Accordingly, based on the type of the array 602 as indicated by the header 610, the appropriate value that is to be loaded from the array can be determined by using the array-index 608. This value can then be loaded onto the top of the execution stack 604.

Thus, the inventive virtual machine instruction ALoad can effectively represent various Java Bytecode instructions that are used to load values from an array. FIG. 6B illustrates a set of conventional Java Bytecode instructions for loading arrays that can be represented by a single inventive virtual machine instruction (e.g., ALoad) in accordance with one embodiment of the invention.

As will be appreciated, the invention also provides for virtual machine instructions used to store values into arrays. By way of example, FIG. 6C illustrates a computing environment 620 in accordance with one embodiment of the invention. An inventive AStore 622 (store into array) virtual machine instruction can be used to store various values from the execution stack 604 into different types of arrays in accordance with on embodiment of the invention. Again, the header 610 of the array 602 can be read to determine the array's type. Based on the array's type, the appropriate value (i.e., the appropriate number of bytes N on the execution stack 604 of FIG. 6B) can be determined. This value can then be stored in the array 602 by using the array-index 626. Thus, the inventive virtual machine instruction ALoad can effectively represent various Java Bytecode instructions that are used to store values into an array. FIGS. 6D and 6E illustrate a set of conventional Java Bytecode instructions for storing arrays that can be represented by an inventive virtual machine instruction (e.g., Astore) in accordance with one embodiment of the invention.

Still further, two or more of the inventive virtual machine instructions can be combined to perform relatively more complicated operations in accordance with one embodiment of the invention. By way of example, the conditional flow control operation performed by the Java Bytecode instruction "Icmp" (compare two long values on the stack and based on the comparison push 0 or 1 on the stack) can effectively be performed by performing an inventive virtual machine instruction LSUB (Long subdivision) followed by another inventive virtual machine instruction JMPEQ (Jump if equal). FIGS. 6F and 6G illustrate some Java conventional Bytecode instructions for performing conditional flow operations which can be represented by two inventive virtual machine instructions in accordance with one embodiment of the invention.

Figure 7A:
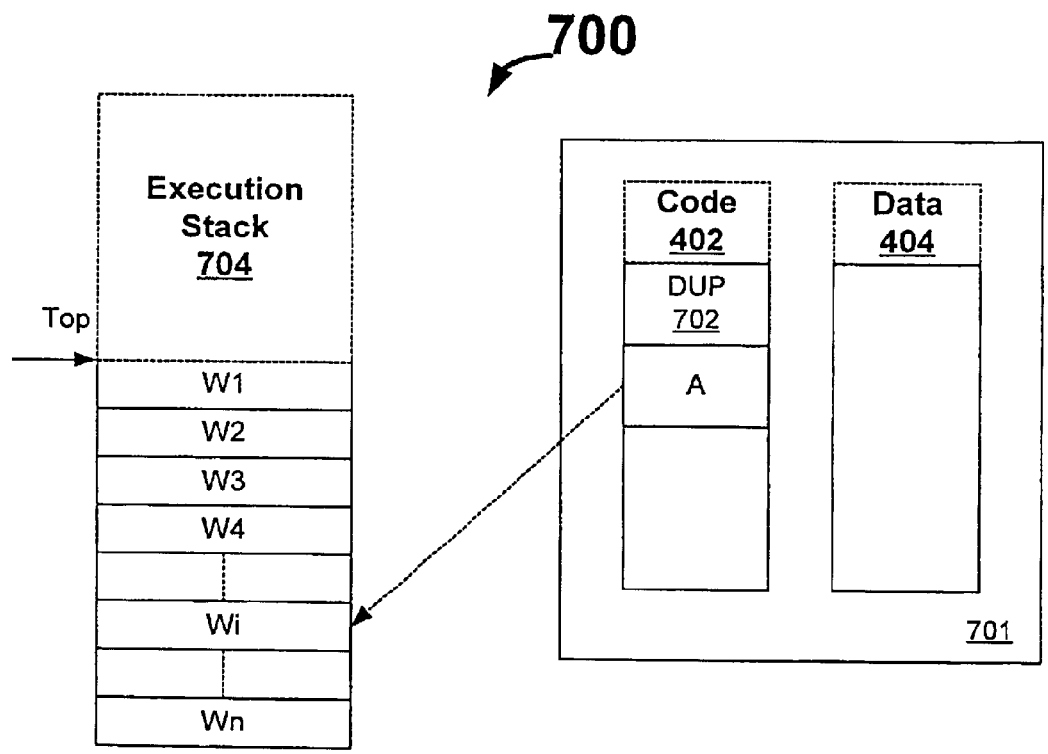
FIG. 7A illustrates a computing environment including an internal representation of a DUP instruction suitable for duplicating values on the stack in accordance with one embodiment of the invention.
Figure 7B:
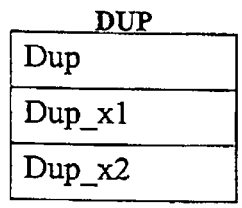
FIGS. 7B and 7C illustrate various Java Bytecode instructions that can be represented by an inventive virtual machine instruction in accordance with one embodiment of the invention.
Figure 7C:
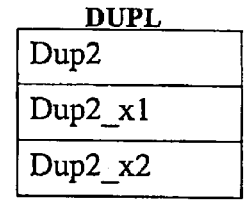

The invention also provides for inventive operations that cannot be performed by Java Bytecode instructions. By way of example, an inventive virtual machine operation "DUP" is provided in accordance with one embodiment of the invention. The inventive virtual machine instruction DUP allows values in various positions on the execution stack to be duplicated on the top of the execution stack. FIG. 7A illustrates a computing environment 700 including an internal representation 701 of a DUP instruction 702 suitable for duplicating values on the stack in accordance with one embodiment of the invention. The internal representation 701 includes a pair of streams, namely, a code stream 402 and a data stream 404. In the described embodiment, each entry in the code stream 402 and data stream 404 represents one byte. The inventive virtual machine instruction DUP 702 is associated with a data parameter A in the code stream 402. Again, it should be noted that Data parameter A can be implemented in the data stream 404. In any case, the data parameter A indicates which 4 byte value (word value) on an execution stack 704 should be duplicated on the top of the execution stack 704. The data parameter A can indicate, for example, an offset from the top of the execution stack 704. As shown in FIG. 7A, the data parameter A can be a reference to $W_i$, a word (4 byte) value on the execution stack. Accordingly, at execution time, the virtual machine can execute the DUP command 702. As a result, the $W_i$ word will be duplicated on the top of the stack. Thus, as will be appreciated, the inventive DUP virtual machine instructions can effectively replace various Java Byte instructions that operate to duplicate 4 byte values on top of the execution. FIG. 7B illustrates some of these Java Bytecode instructions. Similarly, as illustrated in FIG. 7C, an inventive DUPL virtual machine can be provided to effectively replace various Java Bytecode instructions that operate to duplicate 8 byte values (2 words) on top of the execution stack.

It should be noted that conventional Java Bytecode instructions only allow for duplication of values in certain positions on the execution stack (i.e, dup, dup_x1 and dupx2 respectively allow duplication of W1, W2 and W3 on the stack). However, the inventive virtual machine instructions DUP and DUPL can be used to duplicate a much wider range of values on the execution stack (e.g., W4, Wi, WN, etc.)

FIGS. 8A and 8B illustrate mapping of Java Bytecode "Return" instructions to virtual machine instructions provided in accordance with one embodiment of the invention. As shown in FIG. 8A, various Java Bytecode instructions can be effectively mapped into a Return virtual machine instruction. As will be appreciated, the Return virtual machine instruction operates to put 4 byte values (one word) on the execution stack in a similar manner as the virtual machine instructions for loading constants on the stack described above (e.g., iload). FIG. 8B illustrates a mapping of Java Bytecode return instructions to a "Lreturn" virtual machine instruction that can operate to put 8 byte values (two words) on the execution stack.

In a similar manner, FIG. 9 illustrates a mapping of Java Bytecode instantiation instructions to the virtual machine instructions provided in accordance with one embodiment of the invention. Again, the four various Java Bytecode instructions can be effectively mapped into a virtual machine instruction (e.g., NEW). The virtual machine instruction NEW operates to instantiate objects and arrays of various types. In one embodiment, the inventive virtual machine instruction NEW operates to determine the types of the objects or arrays based on the parameter value of the Bytecode instantiation instructions. As will be appreciated, the Bytecode instructions for instantiation are typically followed by a parameter value that indicates the type. Thus, the parameter value is readily available and can be used to allow the NEW virtual machine instruction to instantiate the appropriate type at execution time.

Appendix A illustrates mapping of a set of conventional Java Bytecode instructions to one or more of the inventive virtual machine instructions listed the in right column.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer readable medium including at least computer program code for a reduced set of load constant value virtual machine instructions suitable for execution in a virtual machine to load constant values on an execution stack, the set of virtual machine instructions representing a complete set of Java load constant value Bytecode executable instructions that can be executed to load constant values on an execution stack execution in the virtual machine, wherein the reduced set of the virtual machine instructions consists of a number of virtual machine instructions that is less than the number of instructions in the complete set of Java load constant value Bytecode executable instructions, wherein every one of the instructions in the complete set of Java load constant value Bytecode executable instructions can be represented by at least one of the virtual machine instructions in the reduced set of load constant value virtual machine instructions;

wherein the reduced set of load constant value virtual machine instructions consists of a first, a second, and a third instruction, the first instruction suitable for pushing one byte values on the execution stack, the second instruction suitable for pushing 4 byte values on the execution stack, and the third instruction suitable for pushing 8 byte values on the execution stack;

wherein the first instruction includes a code portion and a data portion which are both represented in a code stream in the virtual machine, and wherein the second instruction includes a code portion and a data portion which are respectively represented in a code stream and in a data stream in the virtual machine.

2. A computer readable medium as recited in claim 1, wherein the set is suitable to load N byte constant values on the execution stack, and wherein N is a positive integer.

3. A reduced set of store local variable virtual machine instructions suitable for execution in a virtual machine to store local variables onto an execution stack, the reduced set of store local variable virtual machine instructions representing the complete set of store local variable Java Bytecode executable instructions that are also suitable for execution in the virtual machine to store local variables onto an execution stack, wherein the reduced set of store local variable virtual machine instructions consists of a number of virtual machine instructions that is less than the number of the complete set of store local variable Java Bytecode executable instructions, wherein every one of the instructions in the complete set of store local variable Java Bytecode executable instructions can be represented by at least one of the virtual machine instructions in the reduced set of store local variable virtual machine instruction set, wherein the set of virtual machine instructions consists of a first instruction and a second instruction, the first instruction being suitable for storing 4 byte local variables onto the execution stack, and the second instruction being suitable for storing 8 byte local variables onto the execution stack, and wherein the first or the second instruction includes a code portion and a data portion which are respectively represented in a code stream and in a data stream in the virtual machine.

4. A computer readable medium as recited in claim 3, wherein the set of set of virtual machine instructions is suitable to store N byte local variables on the execution stack, and wherein N is a positive integer.

5. A computer readable medium including at least computer readable code for a load array virtual machine instruction suitable for execution in a virtual machine to load values from arrays on an execution stack, the load array virtual machine instruction representing the complete set of Java load array Bytecode executable instructions that are used for loading values from arrays on the execution stack; and wherein the load array virtual machine instruction is loaded on the execution stack with an array reference to the array that can be used to determine the array type, and an array index that indicates the size of the array;

wherein the load array virtual machine instruction is represented in a code portion of a set of code and data streams in the virtual machine and the array reference and index are represented in the data stream.

6. A computer readable medium as recited in claim 5, wherein the arrays can be an array of 1 byte values, or an array of 2 byte values, or an array of 4 byte values, or an array of 8 byte values.

7. A computer readable medium, as recited in claim 5, wherein a header of an array is read to determine the type of the array.

8. A computer readable medium including at least computer readable code for a reduced set of store array virtual machine instructions suitable for execution in a virtual machine to store values located on an execution stack into arrays, the reduced set of store array virtual machine instruction representing the complete set of Java store array Bytecode executable instructions that are used for storing values located on an execution stack into an array, wherein each of the store array virtual machine instruction is loaded on the execution stack with an array reference to the array that can be used to determine the array type and an array index that indicates the size of the array, and wherein each of the store array virtual machine instruction represented in a code portion of a set of code and data streams in the virtual machine.

9. A computer readable medium as recited in claim 8, wherein the arrays can be an array of 1 byte values, or an array of 2 byte values, or an array of 4 byte values, or an array of 8 byte values.

10. A computer readable medium as recited in claim 8, wherein a header of an array is read to determine the type of the array.

11. A computer readable medium including at least computer readable code for a reduced set of duplicate value virtual machine instruction suitable for execution in a virtual machine to duplicate values stored in an execution stack on top of the execution stack, the reduced set of duplicate value virtual machine instruction representing the complete set of Java duplicate Bytecode executable instructions that are also suitable for duplicating values stored in the execution stack on top of the execution stack wherein each one of the instructions in the reduced set of duplicate value virtual machine instruction has a Parameter associated with it to indicate which value stored in the execution stack should be duplicated on the top of the stack; and wherein each one of the instructions in the reduced set of duplicate value virtual machine instruction is represented in a code portion of a set of code and data streams in the virtual machine.

12. A computer readable medium as recited in claim 11, wherein values that can be duplicated on the execution stack are not limited to values that are within first, second, and third positions from the top of the stack.

13. A computer readable medium recited in claim 11, wherein the values duplicated on top of the stack can be 4 byte values or 8 byte values.

14. A computer readable medium including at least computer readable code for a return value virtual machine instruction suitable for execution in a virtual machine to return values by placing them on top of an execution stack, the virtual machine instruction representing the complete set of Java return value Bytecode executable instructions that can be used for returning values by placing them on top of the execution stack, wherein the return value virtual machine instruction operates to read an index stored on the execution stack to determine the return value, and wherein the return value virtual machine instruction is represented in a code portion inside the virtual machine, and the index is stored in a data portion inside the virtual machine.

15. A computer readable medium as recited in claim 14, wherein the values returned can be 4 byte values or 8 byte values.

16. A computer readable medium including at least computer program code for an instantiate virtual machine instruction suitable for execution in a virtual machine to instantiate Java objects and arrays, the instantiate virtual machine instruction representing the complete set of Java instantiate Bytecode executable instructions that are also suitable for instantiation of Java objects or arrays; and wherein the instantiate virtual machine instruction operates to determine type based on a parameter value which is loaded on the execution stack; and wherein the instantiate virtual machine instruction is represented in a code portion of a set of code and data streams in the virtual machine.

\* \* \* \* \*